Patented Feb. 27, 1940

2,191,664

UNITED STATES PATENT OFFICE 2,191,664

AGE RESISTING RUBBER COMPOSITION

Joseph R. Ingram, Nitro, W. Va., assignor to Monsanto Chemical Company, St. Louis, Mo., a corporation of Delaware No Drawing. Application November 6, 1937, Serial No. 173,219

14 Claims. (Cl. 260—802)

The present invention relates to the art of rubber manufacture, and particularly relates to the preparation of rubber compositions which resist deterioration due to aging or to exposure to the atmosphere. It has long been known that such deterioration can be greatly retarded by treating the rubber before or after vulcanization with certain substances known as age-resistors or antioxidants. One object of this invention is to provide a superior class of antioxidants for rubber. A further object of this invention is to provide a class of materials which, when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age-resisting characteristics of a vulcanized rubber product can be readily ascertained by subjecting samples of the vulcanized product in a bomb to the action of oxygen under elevated pressure. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

This invention comprises more particularly treating rubber with a reaction product of a ketone and an amino substituted diaryl thio ether wherein one aryl group only is amino substituted, whereby a rubber product possessing improved flexing and aging properties is obtained.

Specific examples of the reaction product of an amino substituted aryl aryl thio ether as defined above and a ketone are the reaction product of p-amino diphenyl thio ether and acetone; the reaction product of 4 amino 4' methyl diphenyl thio ether and acetone; the reaction product of 4 amino phenyl beta naphthyl thio ether and acetone; the reaction product of 4 amino 3' methyl diphenyl thio ether and acetone; the reaction product of p-amino diphenyl thio ether and dibenzyl ketone; the reaction product of p-amino diphenyl thio ether and methyl ethyl ketone, and equivalents and analogues thereof. For example, an amino aryl aryl thio ether as defined above may be condensed with other ketones such as acetophenone, benzophenone, benzoyl acetone, cinnamone, hydroxy benzal acetone, dibenzal acetone, benzoin, etc. but preferably with aliphatic ketones, such as acetone, acetyl acetone, mesityl oxide, phorone, diacetone alcohol, hydroxy acetone, etc. Any one of the above mentioned class of ketone-amino aryl aryl thio ether condensation products as hereinbefore described may be incorporated into rubber or a rubber composition with beneficial effects on its age-resisting properties, and flex cracking resistance thereof.

The preferred class of materials are obtainable by heating the reactants in the presence of a suitable catalyst or condensing agent. Where convenient or desirable other methods well known to those skilled in the art may be employed.

The following are to be understood as illustrative of the invention and not limitative of the scope thereof.

EXAMPLE I 65 parts by weight of para amino diphenyl thio ether and 190 parts by weight of acetone were placed in a suitable reactor and heated in the presence of a suitable catalyst, for example 2 parts by weight of iodine, for 63 hours at substantially refluxing temperature. At the end of this period the unreacted acetone was removed, preferably by distillation, and the residue dissolved in a suitable solvent, for example benzene, and any unreacted para amino diphenyl thio ether removed by passing in dry HCl gas and filtering off the amine salt. The filtrate was washed free of acid and the solvent removed, preferably by distillation. The residue comprising the preferred reaction product was incorporated in the usual manner into a tread stock comprising

| | |
|---|---|
| Smoked sheets | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| Reaction product of para amino diphenyl thio ether and acetone | 1.0 |

The rubber stock thus compounded was vulcanized in the well known manner and portions of the vulcanized product were then artificially aged by heating in a bomb for 120 hours at a temperature of 70° C. and under a pressure of 300 pounds of oxygen per square inch. A comparison between the aged and unaged cured rubber product is given in Table I.

*Table I*

| Cure | | Hrs. aged | Modulus of elasticity in lbs./in.² at elongations of— | | Tensile at break in lbs./in.² | Ult. elong., percent |
|---|---|---|---|---|---|---|
| Mins. | Pounds steam pressure | | 200% | 400% | | |
| 60 | 30 | 0 | 995 | 2900 | 4340 | 550 |
| 60 | 30 | 120 | 810 | 1810 | 1945 | 430 |
| 75 | 30 | 0 | 1090 | 3100 | 4425 | 545 |
| 75 | 30 | 120 | 845 | 1845 | 1870 | 410 |
| 90 | 30 | 0 | 1100 | 3155 | 4200 | 520 |
| 90 | 30 | 120 | 930 | -------- | 1625 | 375 |

The data set forth in Table I show that the preferred class of materials, for example the reaction product of acetone and para amino diphenyl thio ether comprise an important group of anti-oxidants. The cured rubber product containing the reaction product of acetone and para amino diphenyl thio ether was also found on testing in the manner hereinbefore set forth to be markedly superior in flex cracking resistance over a similar stock containing none of the preferred class of materials.

EXAMPLE II 12 parts by weight of 4 amino phenyl beta naphthyl thio ether and substantially 60 parts by weight of acetone were placed in a suitable reactor and heated in the presence of a suitable catalyst, for example a small amount of iodine, for 70 hours at substantially refluxing temperature. At the end of this period the excess acetone was removed, preferably by distillation. The residue was taken up in a suitable solvent, for example benzene and filtered from insoluble impurities. The filtrate was washed free of acid and after removal of the solvent, preferably by distillation, the residue comprising the preferred reaction product was incorporated in the usual manner in a tread stock comprising

| | |
|---|---|
| Smoked sheets | 100 |
| Carbon black | 50 |
| Zinc oxide | 5 |
| Sulfur | 3 |
| Pine tar | 2 |
| Stearic acid | 3 |
| Diphenyl guanidine | 0.2 |
| Benzothiazyl thiobenzoate | 0.8 |
| Reaction product of acetone and 4 amino phenyl beta naphthyl thio ether | 1.0 |

The rubber stock thus compounded was vulcanized in the well known manner and portions of the vulcanized product were then artificially aged by heating in a bomb for 120 hours at a temperature of 70° C. and under a pressure of 300 pounds of oxygen per square inch. A comparison of the aged and unaged cured rubber product is given in Table II.

*Table II*

| Cure | | Hrs. aged | Modulus of elasticity in lbs./in.² at elongations of 200% | Tensile at break in lbs./in.² | Ult. elong., percent |
|---|---|---|---|---|---|
| Mins. | Lbs. steam pressure | | | | |
| 60 | 30 | 0 | 1275 | 4075 | 510 |
| 60 | 30 | 120 | 975 | 1550 | 375 |
| 75 | 30 | 0 | 1300 | 3900 | 490 |
| 75 | 30 | 120 | 955 | 1475 | 320 |
| 90 | 30 | 0 | 1350 | 3950 | 485 |
| 90 | 30 | 120 | 1000 | 1375 | 300 |

The data set forth in Table II show the typical desirable aging qualities of the preferred class of materials. The cured rubber product containing the reaction product of acetone and 4 amino phenyl beta naphthyl thio ether was likewise found on testing in the manner hereinbefore set forth to be superior in flex cracking resistance over a similar stock containing none of the preferred class of materials.

EXAMPLE III 6 parts by weight of 4 amino 3' methyl diphenyl thio ether and substantially 40 parts by weight of acetone were placed in a suitable reactor and heated in the presence of a suitable catalyst, for example a small amount of iodine, for 70 hours at substantially refluxing temperature. At the end of this period the excess acetone was removed, preferably by distillation, and the residue dissolved in a suitable solvent, for example benzene, and filtered from insoluble impurities. The filtrate was washed free of acid and the solvent removed, preferably by distillation. The residue comprising the preferred reaction product was incorporated in the usual manner in a typical tread stock comprising

| | |
|---|---|
| Smoked sheets | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| Reaction product of acetone and 4 amino 3' methyl diphenyl thio ether | 1.0 |

The rubber stock thus compounded was vulcanized in the well known manner and portions of the vulcanized product were then artificially aged by heating in a bomb for 120 hours at a temperature of 70° C. and under a pressure of 300 pounds of oxygen per square inch. A comparison between the aged and unaged cured rubber product is given in Table III.

*Table III*

| Cure | | Hrs. aged | Modulus of elasticity in lbs./in.² at elongation of 200% | Tensile at break in lbs./in.² | Ult. elong., percent |
|---|---|---|---|---|---|
| Mins. | Lbs. steam pressure | | | | |
| 60 | 30 | 0 | 1100 | 4050 | 530 |
| 60 | 30 | 120 | 950 | 1625 | 375 |
| 75 | 30 | 0 | 1200 | 3950 | 510 |
| 75 | 30 | 120 | 955 | 1575 | 340 |
| 90 | 30 | 0 | 1270 | 4100 | 500 |
| 90 | 30 | 120 | 830 | 1400 | 355 |

The data set forth in Table III show the typical desirable aging qualities of the preferred class of materials. Furthermore the cured rubber product containing the reaction product of acetone and 4 amino 3' methyl diphenyl thio ether was also found on testing in the manner hereinbefore set forth to be markedly superior in flex cracking resistance over a similar stock containing none of the preferred class of materials.

EXAMPLE IV 22 parts by weight of 4 amino 4' methyl diphenyl thio ether and substantially 80 parts by weight of acetone were placed in a suitable reactor and heated in the presence of an acid condensation catalyst. The heating was continued for 60 hours at substantially refluxing temperature and the acetone was then removed, preferably by distillation and the residue dissolved in a suitable solvent, as for example benzene, and filtered from insoluble impurities. The filtrate was washed free of acid and the solvent removed, preferably by distillation. The residue comprising the preferred reaction product remained as a solid melting at 65° C. and was incorporated in the usual manner into a typical rubber stock and found to possess properties characteristic of the preferred class of materials.

In the preparation of the antioxidants of the present invention other proportions of the reactants and other means of reacting said reactants may be employed than those specifically disclosed above. Thus, an excess of ketone has been employed wherein the excess functions as a solvent but the reaction may be carried out without a solvent by continuously passing the vaporized ketone, for example acetone vapor, through an amino substituted, diaryl thio ether as hereinbefore defined, maintained in a molten condition. Furthermore, the reaction may be carried out under a positive pressure. It is thus evident that a wide range of temperatures, pressures and proportions of reactants may be utilized in the preparation of the preferred class of materials. Suitable catalysts comprise bromine, iodine, benzene sulfonic acid, hydrochloric acid, sulfuryl chloride and other acid condensation catalysts.

As further specific embodiments of the present invention 4 amino diphenyl thio ether was reacted with dibenzyl ketone in a manner similar to that described in the foregoing examples and the reaction products so obtained incorporated in typical rubber stocks and found on testing to exhibit desirable properties characteristic of the preferred class of materials.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resistors of this invention. The antioxidants or age-resistors may be employed in different proportions than herein described and in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than those specifically shown with varying differences in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "rubber" is likewise employed in the claims in a generic sense to include caoutchouc, whether natural or synthetic, reclaimed rubber, balata, guttapercha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a product obtainable by heating in the presence of a condensation catalyst a ketone and a primary para amino substituted diaryl thio ether, said aryl radicals being selected from the benzene and naphthalene series, and wherein one aryl radical only is amino substituted.

2. The method of preserving rubber which comprises treating rubber with a product obtainable by heating a primary para amino substituted diaryl thio ether, said aryl radicals being selected from the benzene and naphthalene series, and wherein one aryl radical only is amino substituted and an aliphatic ketone containing more than two but less than ten carbon atoms in the presence of a condensation agent.

3. The method of preserving rubber which comprises treating rubber with a product obtainable by heating a primary para amino substituted diaryl thio ether, said aryl radicals being selected from the benzene and naphthalene series, and wherein one aryl radical only is amino substituted and an aliphatic ketone in the presence of a condensation agent.

4. The method of preserving rubber which comprises treating rubber with a product obtainable by heating a primary para amino substituted diaryl thio ether, said aryl radical being selected from the benzene and naphthalene series and wherein one aryl radical only is amino substituted and one member of a group consisting in acetone, methyl ethyl ketone, diacetone alcohol, mesityl oxide, phorone, acetyl acetone and hydroxy acetone in the presence of a condensation agent.

5. The method of preserving rubber which comprises treating rubber with a product obtainable by heating para amino diphenyl thio ether and acetone in the presence of a condensation agent.

6. The method of preserving rubber which comprises treating rubber with a product obtainable by heating 4 amino 3' methyl diphenyl thio ether and acetone in the presence of a condensation agent.

7. The method of preserving rubber which comprises treating rubber with a product obtainable by heating 4 amino phenyl beta naphthyl thio ether and acetone in the presence of a condensation agent.

8. The method of preserving rubber which comprises treating rubber with a product obtainable by heating a primary para amino substituted diaryl thio ether, said aryl radicals being selected from the benzene and naphthalene series, and wherein one aryl radical only is amino substituted, and methyl ethyl ketone in the presence of a condensation agent.

9. The vulcanized rubber product prepared by heating rubber and sulfur in the presence of a product obtainable by heating a primary para amino substituted diaryl thio ether, said aryl amino substituted diaryl thio ether, said aryl radicals being selected from the benzene and naphthalene series, and wherein one aryl radical only is amino substituted and an aliphatic ketone in the presence of a condensation agent.

10. The vulcanized rubber product prepared by heating rubber and sulfur in the presence of a product obtainable by heating a primary para amino substituted diaryl thio ether, said aryl radical being selected from the benzene and naphthalene series and wherein one aryl radical only is amino substituted and one member of a group consisting in acetone, methyl ethyl ketone, diacetone alcohol, mesityl oxide, phorone, acetyl acetone and hydroxy acetone in the presence of a condensation agent.

11. The vulcanized rubber product prepared by heating rubber and sulfur in the presence of a product obtainable by heating para amino diphenyl thio ether and acetone in the presence of a condensation agent.

12. The vulcanized rubber product prepared by heating rubber and sulfur in the presence of a product obtainable by heating 4 amino 3' methyl diphenyl thio ether and acetone in the presence of a condensation agent.

13. The vulcanized rubber product prepared by heating rubber and sulfur in the presence of a product obtainable by heating 4 amino phenyl beta naphthyl thio ether and acetone in the presence of a condensation agent.

14. The vulcanized rubber product prepared by heating rubber and sulfur in the presence of a product obtainable by heating a primary para amino substituted diaryl thio ether, said aryl radicals being selected from the benzene and naphthalene series, and wherein one aryl radical only is amino substituted, and methyl ethyl ketone in the presence of a condensation agent.

JOSEPH R. INGRAM.